(12) United States Patent
Tabares et al.

(10) Patent No.: US 7,574,713 B2
(45) Date of Patent: Aug. 11, 2009

(54) METHODS, SYSTEMS, AND COMPUTER PROGRAM PRODUCTS FOR INSTANTIATING A DEVICE DRIVER FOR COMMUNICATION WITH A DEVICE BY DYNAMICALLY ASSOCIATING THE DEVICE DRIVER AT RUN-TIME WITH A DEVICE-SPECIFIC AND/OR SERVICE-SPECIFIC SOFTWARE COMPONENT

(75) Inventors: Modesto Tabares, Miramar, FL (US); Sameh Yamany, Weston, FL (US)

(73) Assignee: Trendium, Inc., Sunrise, FL (US)

( * ) Notice: Subject to any disclaimer, the term of this patent is extended or adjusted under 35 U.S.C. 154(b) by 1731 days.

(21) Appl. No.: 09/992,155

(22) Filed: Nov. 5, 2001

(65) Prior Publication Data

US 2003/0088711 A1 May 8, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/321; 719/327; 710/8; 710/10

(58) Field of Classification Search ............... 709/224, 709/327; 713/1, 324; 348/222; 719/311, 719/321–327; 710/8–10
See application file for complete search history.

(56) References Cited

U.S. PATENT DOCUMENTS

| 4,649,476 | A | | 3/1987 | Advani et al. ............... 364/300 |
| 5,727,212 | A | * | 3/1998 | Dinallo ....................... 719/321 |
| 5,752,032 | A | * | 5/1998 | Keller et al. ................. 719/311 |
| 5,872,956 | A | | 2/1999 | Beal et al. ................... 395/500 |
| 6,044,224 | A | | 3/2000 | Radia et al. ................. 395/710 |
| 6,473,824 | B1 | * | 10/2002 | Kreissig et al. ........... 348/222.1 |
| 2002/0059474 | A1 | * | 5/2002 | Camara et al. .............. 709/321 |
| 2005/0034029 | A1 | * | 2/2005 | Ramberg et al. .............. 714/43 |

FOREIGN PATENT DOCUMENTS

EP 0442676 A2 8/2001

(Continued)

OTHER PUBLICATIONS

Martin et al, Professional XML, Wrox Press, 2000, pp. 9-17.*

(Continued)

*Primary Examiner*—Meng-Ai An
*Assistant Examiner*—Diem K Cao
(74) *Attorney, Agent, or Firm*—Myers Bigel Sibley & Sajovec, P.A.

(57) ABSTRACT

Embodiments of the present invention provide methods, systems, and computer program products for instantiating a device driver for communication with a device by dynamically associating the device driver at run-time with a device-specific software component. For example, in some embodiments, a device driver is instantiated by dynamically associating a first software component with the device driver at run-time. The first software component contains information that facilitates communication with devices of a specific type. In other embodiments, a device driver is instantiated by defining a plurality of device parameters and associating one or more of the plurality of device parameters with a service. The device parameters that are associated with the service are then dynamically communicated to the device driver at run-time.

39 Claims, 7 Drawing Sheets

FOREIGN PATENT DOCUMENTS

WO     WO97/21161     6/1997
WO     WO99/45695     9/1999

OTHER PUBLICATIONS

International Search Report dated Dec. 4, 2003 for corresponding application No. PCT/US02/32707.

Lemon et al. "An Object Oriented Device Driver Model," IEEE, 1995, pp. 360-366.

John et al. "A Java-Based SNMP Agent for Dynamic MIBS," IEEE Global Telecommunications Conference, Dec. 5, 1999, pp. 396-400.

* cited by examiner

METHODS, SYSTEMS, AND COMPUTER PROGRAM PRODUCTS FOR INSTANTIATING A DEVICE DRIVER FOR COMMUNICATION WITH A DEVICE BY DYNAMICALLY ASSOCIATING THE DEVICE DRIVER AT RUN-TIME WITH A DEVICE-SPECIFIC AND/OR SERVICE-SPECIFIC SOFTWARE COMPONENT

BACKGROUND OF THE INVENTION

The present invention relates generally to the field of computer software, and, more particularly, to device driver software modules/components that permit a data processing system to communicate with a device.

Deregulation of telecommunications providers, new communications technologies, and the Internet have often been cited as important factors in bringing about increased competition in the delivery of telecommunications services. As a result of this increased competition, telecommunications providers have generally been under pressure to improve efficiency and cut costs and yet still maintain a high quality level of service for their customers. In this competitive environment, one area in which telecommunications providers may be able to gain a competitive edge is in the support systems that are used to operate, manage, and maintain the telecommunications networks. These support systems may be called operational support systems (OSS).

Broadly stated, an OSS for a telecommunications network may include software services that are used to support the operations of a telecommunications network. Three support areas that may be addressed by a telecommunications OSS are 1) provisioning and order management, 2) billing and customer support, and 3) service quality management. Provisioning and order management may include such functions as service activation, service order processing, and service provisioning. Billing and customer support may include such functions as data collection, retail and wholesale billing, bill compilation, and customer care. Finally, service quality management may include such functions as service level agreements (SLAs), quality of service delivery, fault management, performance monitoring, error analysis, and security.

In general, OSS software solutions have been developed to address a specific task domain, such as one of the three support areas cited above at the network and/or service level. Unfortunately, one problem that developers of service/network management systems may face is the ability to adapt in real-time to a new device in a network and/or to a new service technology whose performance may be evaluated based on different statistical parameters than have heretofore been collected from the network devices.

SUMMARY OF THE INVENTION

Embodiments of the present invention provide methods, systems, and computer program products for instantiating a device driver for communication with a device by dynamically associating the device driver at run-time with a device-specific software component. For example, in some embodiments, a device driver is instantiated by dynamically associating a first software component with the device driver at run-time. The first software component contains information that facilitates communication with devices of a specific type. In other embodiments, a device driver is instantiated by defining a plurality of device parameters and associating one or more of the plurality of device parameters with a service. The device parameters that are associated with the service are then dynamically communicated to the device driver at run-time.

Thus, a "generic" device driver may be dynamically configured at run-time to communicate with devices of a particular device type and/or device parameters may be associated with a service and communicated to the device driver. These device parameters that are associated with a particular service and then passed to the device driver may allow the device driver to collect data from a particular device that is relevant to a particular service offering. A service management system or operational support system (OSS) for a network, therefore, may use embodiments of the present invention to dynamically adapt to new devices installed in the network and/or to new services provided via the network.

In further embodiments of the present invention, a parameter base class may be declared that defines the plurality of device parameters. Ones of the plurality of device parameters may be associated with a service by deriving a service-specific sub-class from the parameter base class that defines the device parameters that are associated with the service.

In still further embodiments of the present invention, the parameter base class may define a plurality of common device parameters that are common to a plurality of services. A second software component, which may be embodied as a script file and/or an extensible markup language (XML) file, may be provided that defines a plurality of service-specific device parameters. The parameter base class may be instantiated to create a parameter base class object and the parameter base class object may be dynamically loaded with the second software component to configure the parameter base class object with all of the device parameters associated with a specific service. The parameter base class object may then pass these device parameters associated with a specific service to the device driver.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
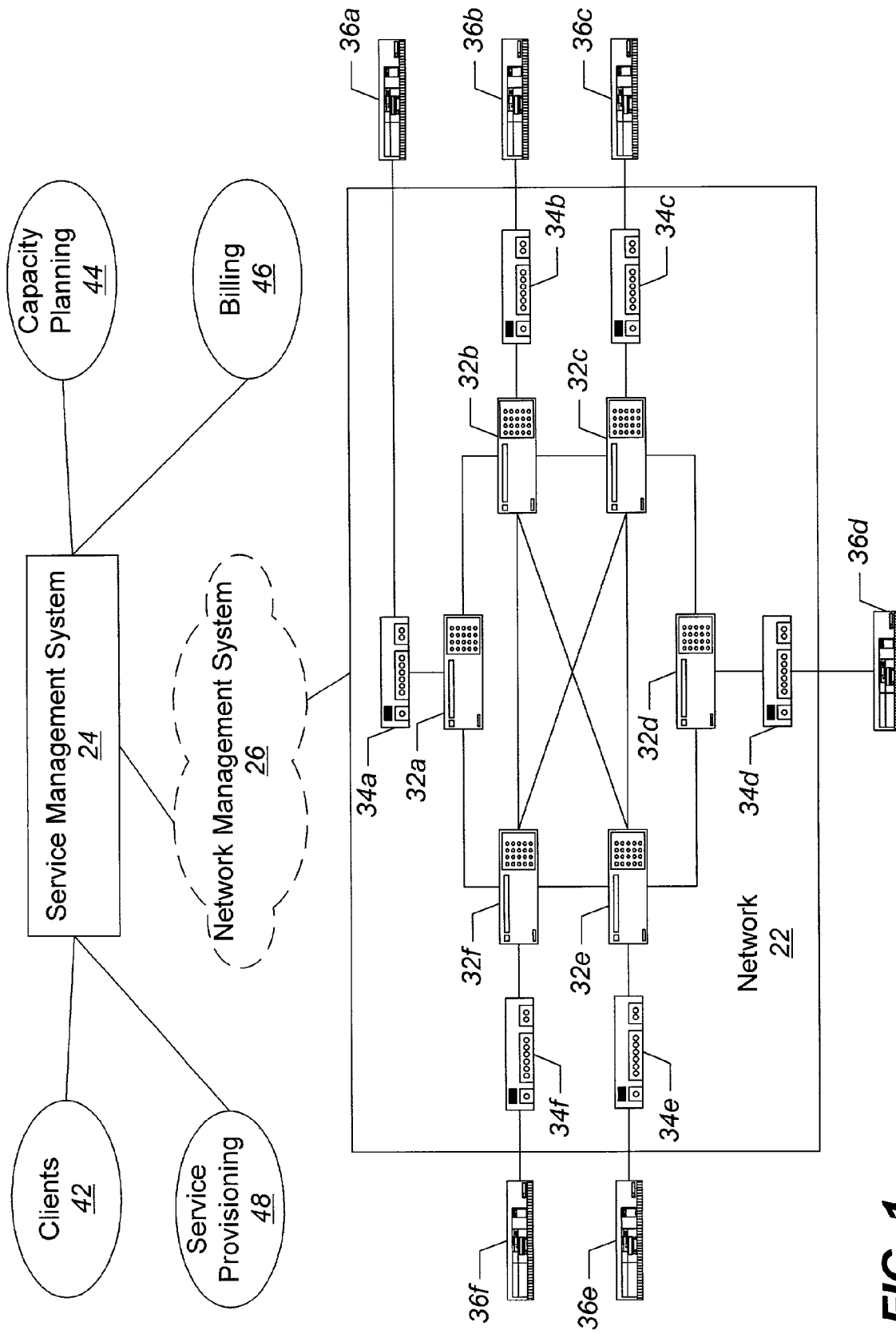
FIG. 1 is a block diagram that illustrates service management system architectures in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Referring now to FIG. 1, an exemplary service management system architecture, in accordance with embodiments of the present invention, includes a network 22, a service management system 24, and, optionally, a network management system 26 that may be used to interface the service management system 24 to the network 22. The network 22 may include one or more core network elements 32a, 32b, 32c, 32d, 32e, and 32f and one or more access network elements 34a, 34b, 34c, 34d, 34e, and 34f as shown. The access network elements 34a, 34b, 34c, 34d, 34e, and 34f comprise those network elements that are configured at the edge of the network 22 and provide access to the network 22 for access devices from another public or private network. Accordingly, the access network elements 34a, 34b, 34c, 34d, 34e, and 34f may include one or more ports through which a user network interface (UNI) or network interface (NI) may be defined. As illustrated in FIG. 1, each access network element 34a, 34b, 34c, 34d, 34e, and 34f is in communication with a single customer access device 36a, 36b, 36c, 36d, 36e, and 36f over a single NI.

The service management system 24 may communicate with the access network elements 34a, 34b, 34c, 34d, 34e, and 34f and/or the core network elements 32a, 32b, 32c, 32d, 32e, and 32f to collect, for example, performance, configuration, topology, timing, and/or traffic data therefrom. The data collected by the service management system 24 are stored in repositories for use by other applications. The repositories may be implemented as relational database management systems (RDBMS) that support the structured query language (SQL). It may be desirable to store the collected data in a SQL database to facilitate access of the collected data by other applications. Advantageously, applications may access a SQL database without having to know the proprietary interface of the underlying RDBMS.

Client applications 42 may communicate with the service management system 24 to access reports generated by the service management system 24 based on analyses of the collected data and to manage the services provided by the network 22 (e.g., determine whether the services provided by the network 22 are in conformance with an agreed upon quality of service). Capacity planning applications 44 may communicate with the service management system 24 to assist an administrator in shaping/configuring the topology/shape of the network 22 and/or to distribute traffic carried by the network 22. Billing applications 46 may communicate with the service management system 24 to generate bills based on analyses of the data collected from the network 22. Finally, service provisioning applications 48 may communicate with the service management system 24 to facilitate the introduction of new services into the network 22.

The service management system 24 and/or data processing system(s) supporting the client applications 42, the capacity planning applications 44, the billing applications 46, and the service provisioning applications 48 may be configured with computational, storage, and control program resources for managing service quality, in accordance with the present invention. Thus, the service management system 24 and the data processing system(s) supporting the client applications 42, the capacity planning applications 44, the billing applications 46, and the service provisioning applications 48 may each be implemented as a single processor system, a multi-processor system, or even a network of stand-alone computer systems.

Although FIG. 1 illustrates an exemplary service management system architecture, it will be understood that the present invention is not limited to such a configuration but is intended to encompass any configuration capable of carrying out the operations described herein.

Figure 2:
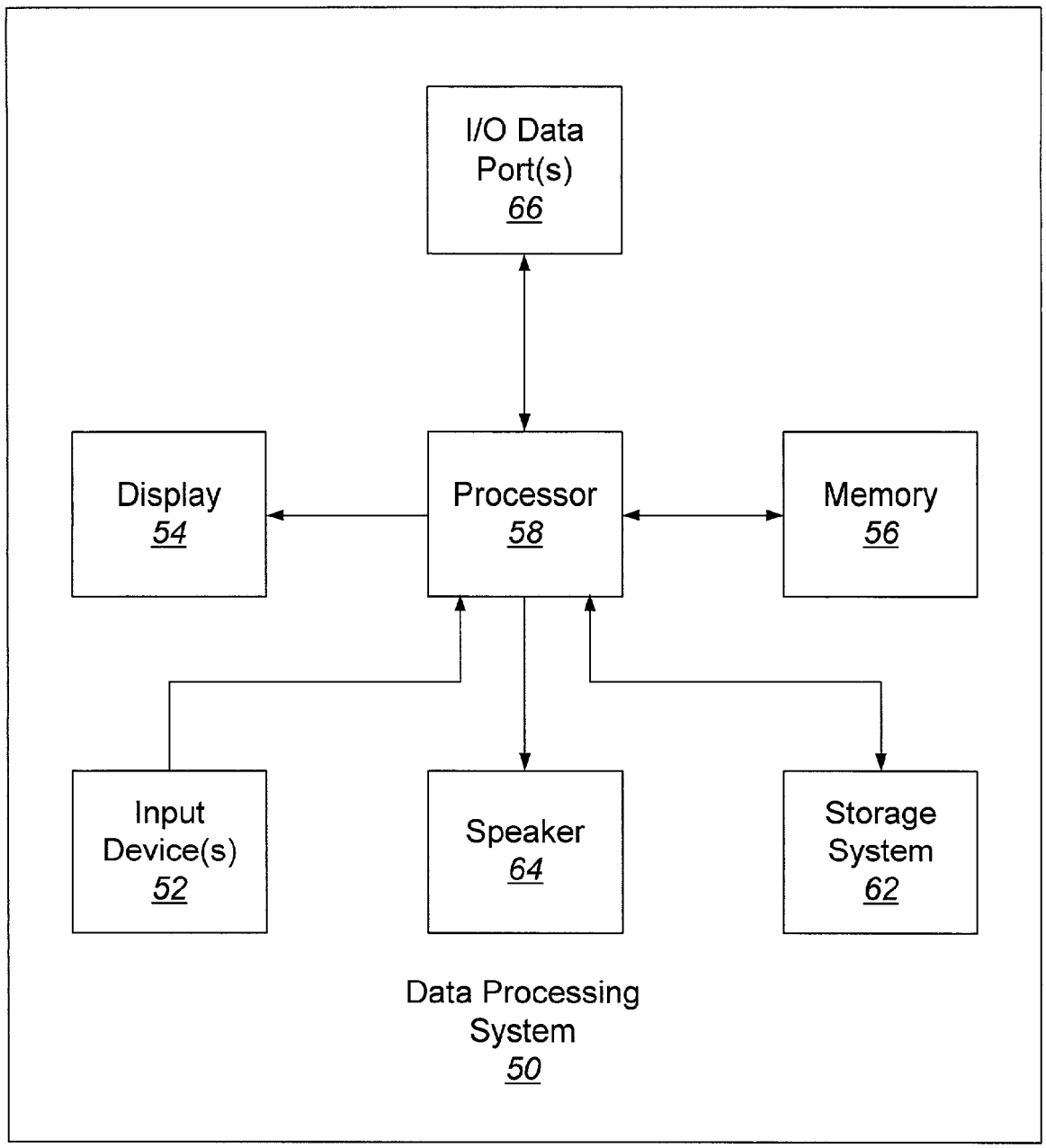
FIG. 2 is a block diagram that illustrates data processing systems in accordance with embodiments of the present invention.

Referring now to FIG. 2, an exemplary data processing system 50 architecture is illustrated, which may be used in embodiments of the service management system 24 and the data processing system(s) supporting the client applications 42, the capacity planning applications 44, the billing applications 46, and the service provisioning applications 48, in accordance with the present invention. The data processing system 50 may include input device(s) 52, such as a keyboard or keypad, a display 54, and a memory 56 that communicate with a processor 58. The data processing system 50 may further include a storage system 62, a speaker 64, and an input/output (I/O) data port(s) 66 that also communicate with the processor 58. The storage system 62 may include removable and/or fixed media, such as floppy disks, ZIP drives, hard disks, or the like, as well as virtual storage, such as a RAM-DISK. The I/O data port(s) 66 may be used to transfer information between the data processing system 50 and another computer system or a network (e.g., the Internet). These components may be conventional components such as those used in many conventional computing devices and/or systems, which may be configured to operate as described herein.

Figure 3:
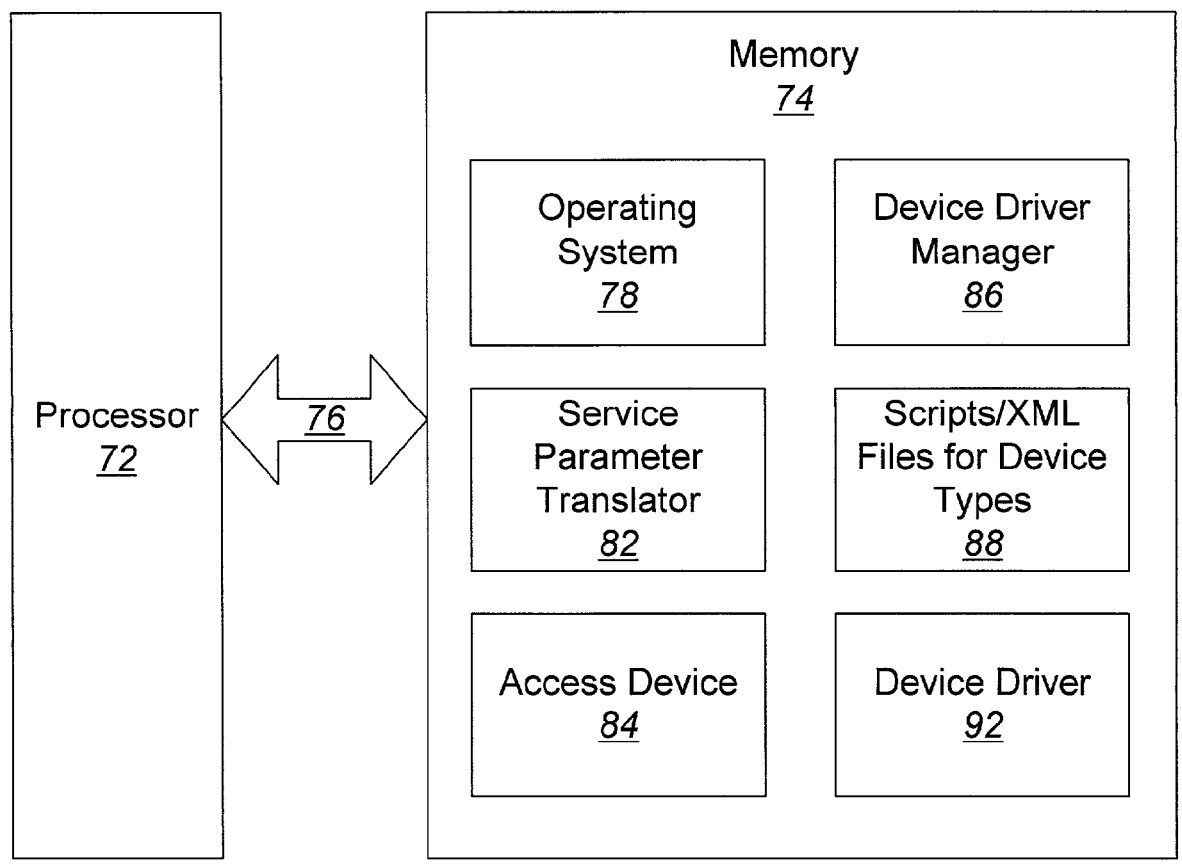
FIG. 3 is a software architecture block diagram that illustrate methods, systems, and computer program products for instantiating a device driver for communication with a device in accordance with embodiments of the present invention.

FIG. 3 illustrates a processor 72 and a memory 74 that may be used in embodiments of the service management system 24 in accordance with the present invention. The processor 72 communicates with the memory 74 via an address/data bus 76. The processor 72 may be, for example, a commercially available or custom microprocessor. The memory 74 is representative of the overall hierarchy of memory devices containing the software and data used to collect data/information from network devices via a dynamically configurable device driver in accordance with embodiments of the present invention. The memory 74 may include, but is not limited to, the following types of devices: cache, ROM, PROM, EPROM, EEPROM, flash, SRAM, and DRAM.

As shown in FIG. 3, the memory 74 may contain up to six or more major categories of software and/or data: the operating system 78, the service parameter translator (SPT) program module 82, the access device program module 84, the device driver manager program module 86, the scripts/extensible markup language (XML) files for device types program module 88, and the device driver program module 92. The operating system 78 controls the operation of the computer system. In particular, the operating system 78 may manage the computer system's resources and may coordinate execution of programs by the processor 72. The SPT program 82 may be configured to determine which device parameters should be collected for a particular service. The SPT program 82 may effectively map a required service parameter to a generic device parameter to be collected. In accordance with embodiments of the present invention, the generic device parameter is not associated with any specific device type or configuration.

Figure 4:
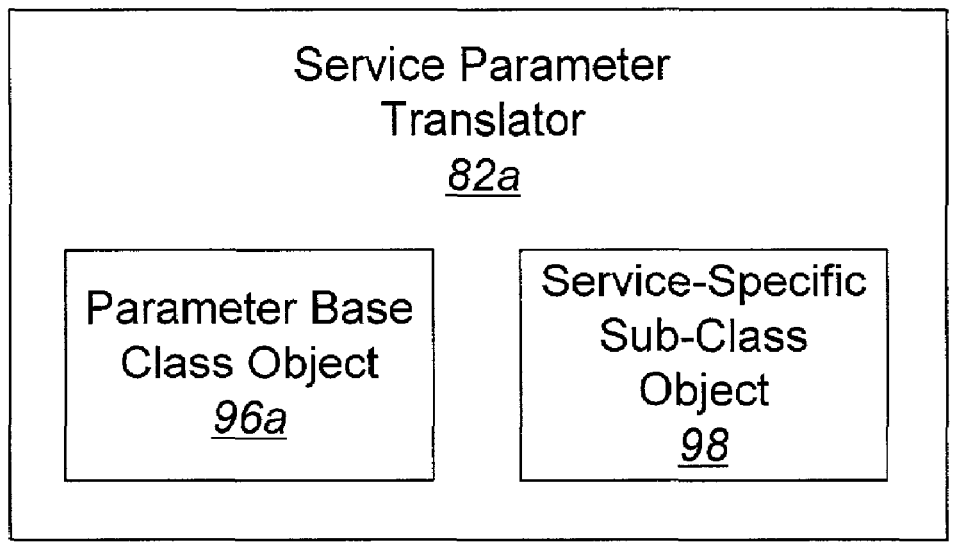
FIGS. 4 and 5 are software architecture block diagrams that illustrate a service parameter translator module in accordance with embodiments of the present invention.

In accordance with various embodiments of the present invention, the SPT program 82 may be implemented in alternative ways. Referring now to FIG. 4, a SPT program 82a comprises a parameter base class object 96a and a service-specific sub-class object 98. The parameter base class object 96a may be an instantiation of a parameter base class that defines a plurality of device parameters that may be collected from network devices for a plurality of services. One or more service-specific sub-class objects 98 may be instantiated from service-specific sub-classes that are derived from the parameter base class to define those device parameters that are associated with a particular service. Alternatively, the parameter base class may define those device parameters that are common to each one of the plurality of services that are provided via the network. The service-specific sub-class may be derived from the parameter base class 96a to inherit the common device parameters, and may also define device parameters that are associated with a particular service.

Figure 5:
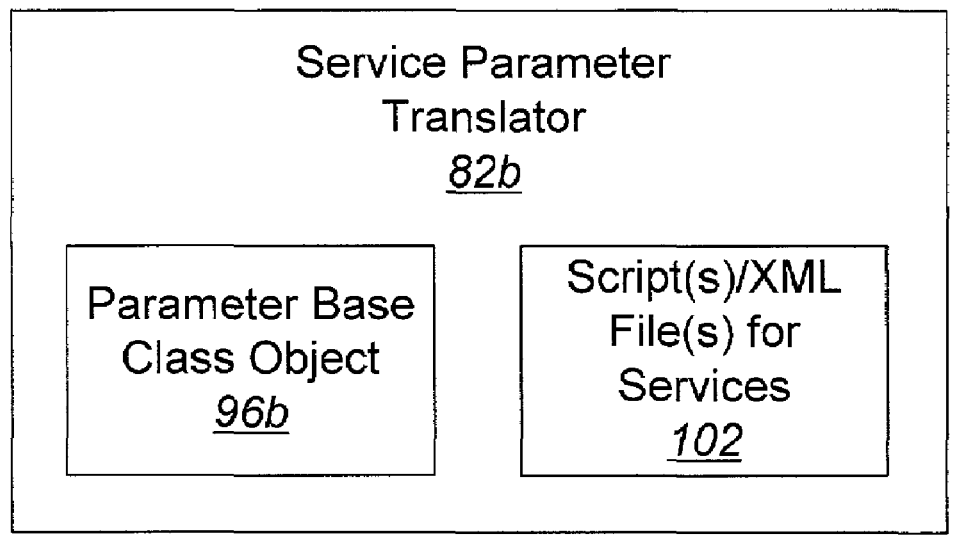

In other embodiments of the present invention illustrated in FIG. 5, a SPT program 82b comprises a parameter base class object 96b and script(s)/XML file(s) 102 that are associated with specific services. The parameter base class object 96b may be an instantiation of a parameter base class that defines those device parameters that are common to each one of the plurality of services that are provided via the network. The script(s)/XML file(s) 102 may be used to define those device parameters that are associated with specific services. The parameter base class object 96b may be dynamically configured to include all of the device parameters associated with a specific service by loading the script and/or the XML file that defines the device parameters for that specific service.

Returning to FIG. 3, the access device program 84 may be configured to instantiate the device driver manager 86 with the particular device type (e.g., Lucent device, Cisco device, etc.) from which data is to be collected. The device driver manager 86 may be configured to load the device driver 92 with one of the script(s)/XML file(s) 88 that is associated with a particular device from which data is to be collected. Specifically, each of the script(s)/XML file(s) 88 contains information that facilitates communication with a specific device type, such as message formats, addresses, register names, communication protocol to be used, etc. In particular embodiments of the present invention, the service management system 24 may include an interface, such as a graphical user interface (GUI), that may be used to read management information base (MIB) data from devices in the network 22 and to compile this information. The compiled MIB data for a particular device type may be stored in a script and/or an XML file associated with that specific device type. Moreover, the compiled MIB data may be associated with device parameters, which may be read by the service management system 24 using the device driver 92. The device driver 92 may be viewed as a "generic" device driver, which may be dynamically configured to communicate with a specific device type by loading a particular script and/or XML file that is associated with that device type.

Although FIGS. 3-5 illustrate an exemplary software architecture that may be used for instantiating a device driver for communication with a device, in accordance with embodiments of the present invention, it will be understood that the present invention is not limited to such a configuration but is intended to encompass any configuration capable of carrying out the operations described herein.

Computer program code for carrying out operations of the present invention may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

With reference to the flowcharts of FIGS. 6-10, exemplary operations of methods, systems, and computer program products for instantiating a device driver for communication with a device, in accordance with embodiments of the present invention, will be described hereafter.

Figure 6:
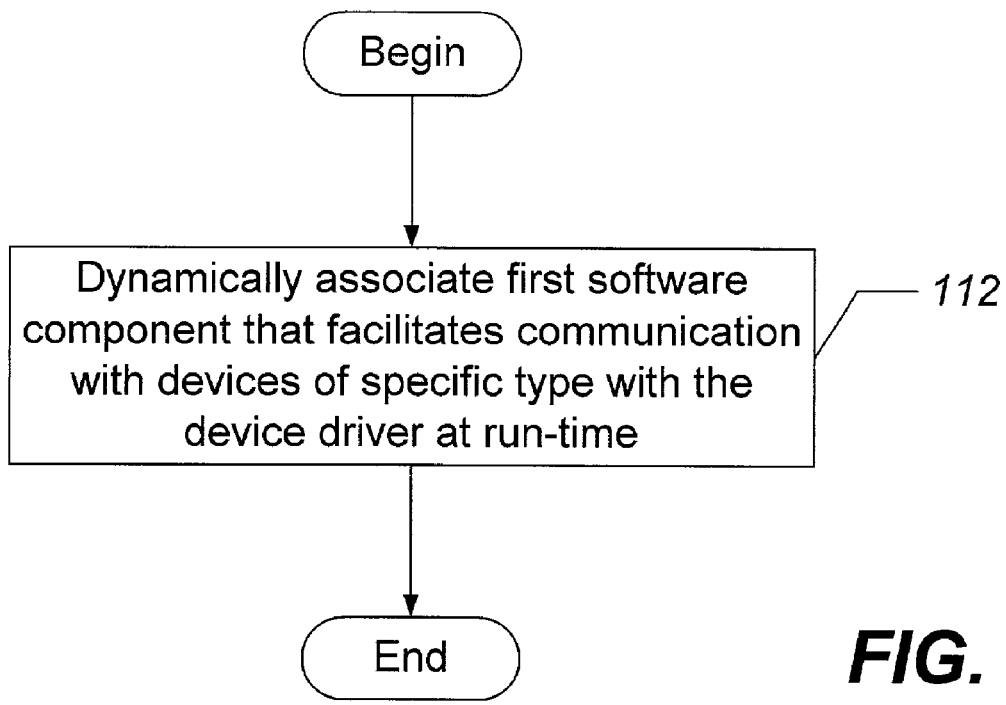
FIGS. 6-10 are flowcharts that illustrate exemplary operations of methods, systems, and computer program products for instantiating a device driver for communication with a device in accordance with embodiments of the present invention.
Figure 7:
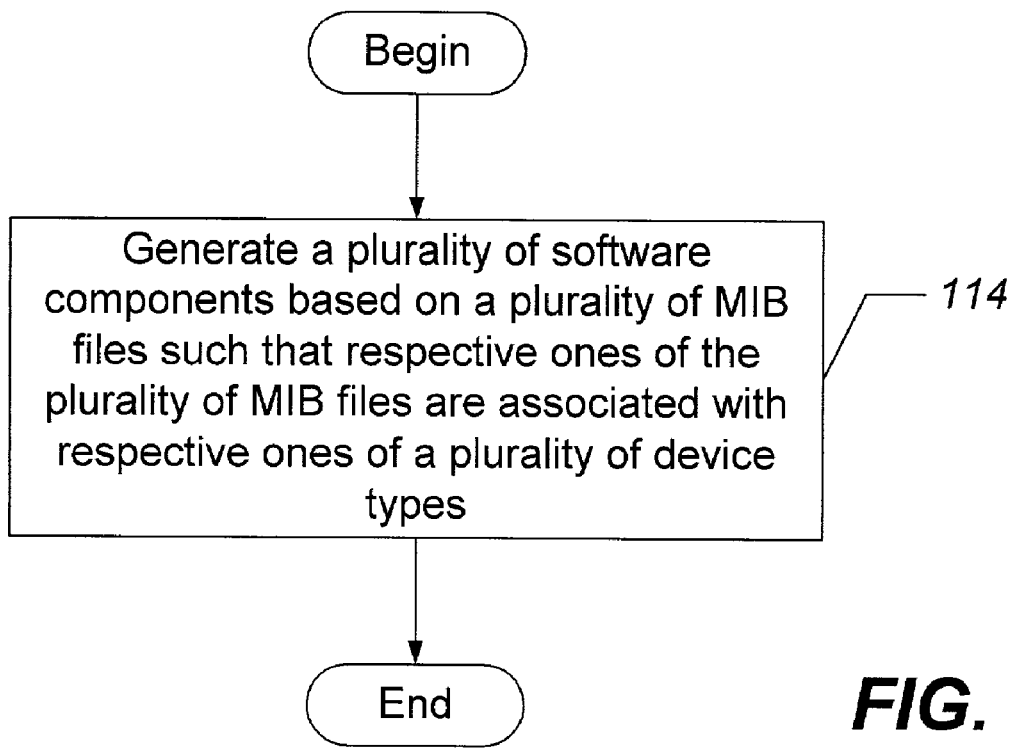

Referring now to FIG. 6, the device driver 92 may be instantiated at block 112 by dynamically associating a first software component, such as a script and/or an XML file 88 for a specific device type, with the device driver 92 at run-time. For example, the device driver manager 86 may load the device driver 92 with one of the scripts and/or XML files 88 that is associated with a specific device type so that the device driver 92 is configured to communicate with devices of that specific type. Referring now to FIG. 7, in particular embodiments of the present invention, the scripts and/or XML files 88 comprise a plurality of software components that are generated based on a plurality of MIB files such that respective ones of the plurality of MIB files are associated with respective ones of a plurality of device types at block 114. That is, scripts and/or XML files 88 may be generated for each device type in the network 22 from which data is to be collected based respective MIB files for the device types.

Figure 8:
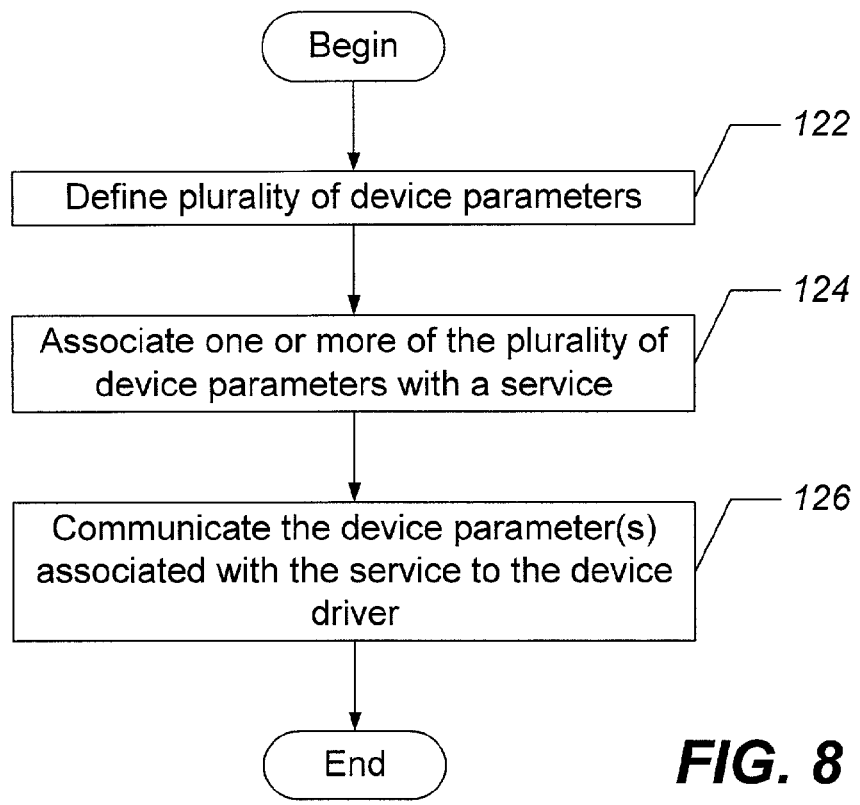

In other embodiments of the present invention illustrated in FIG. 8, the device driver 92 may be instantiated by defining a plurality of device parameters, associating the device parameters at block 122, and then associating one or more of the plurality of device parameters with a service at block 124. Embodiments of the SPT program 82, which have been discussed hereinabove with respect to FIGS. 4 and 5, may be used to define the plurality of device parameters and associate one or more of the device parameters with a service. At block 126, the device parameters that are associated with a particular service are communicated to the device driver 92. In particular embodiments of the present invention, a service-specific sub-class object 98 (see FIG. 4) is instantiated to define the device parameters that are associated with a particular service and these device parameters that are associated with the service are passed from the service-specific sub-class object 98 to the device driver 92. In other embodiments of the present invention, the parameter base class object 96b (see FIG. 5) is instantiated and loaded with a script and/or an XML file 102. In combination, the parameter base class object 96b and the script/XML file 102 define those device parameters that are associated with a particular service. The parameter base class object 96b having been configured for a particular service by having loaded a service-specific script/XML file 102 may pass the device parameters that are associated with the particular service to the device driver 92.

Figure 9:
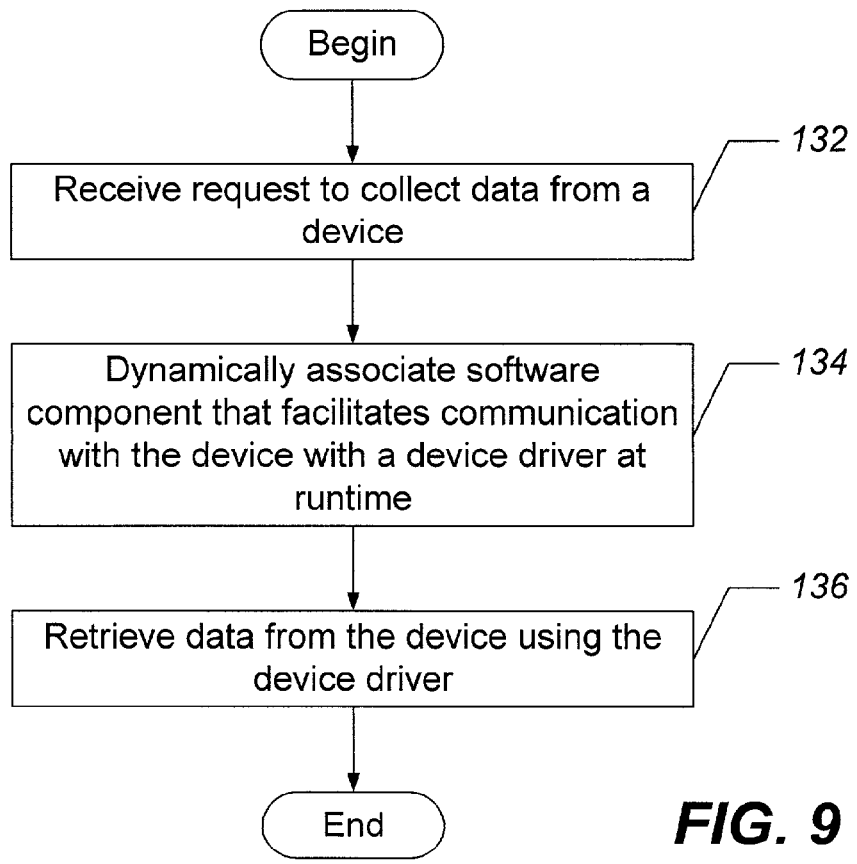

In further embodiments of the present invention, the service management system 24 may use the device driver 92 to collect data from a device in the network 22. Referring now to FIGS. 1, 3, and 9, the access device program 84 may receive a request to collect data from a particular device at block 132. This request may be generated automatically from a periodic data collection process or may be generated based on a data collection demand issued by a user of the service management system 24. The access device program 84 may instantiate the device driver manager 86 with information that identifies the target device type (i.e., the type of device from which data is to be collected). At block 134, the device driver 92 may be instantiated by dynamically associating a first software component, such as a script and/or an XML file 88 for the target device type, with the device driver 92 at run-time as discussed hereinabove with reference to FIG. 6. The service management system 24 may then retrieve data from the target device using the device driver 92 at block 136.

Figure 10:
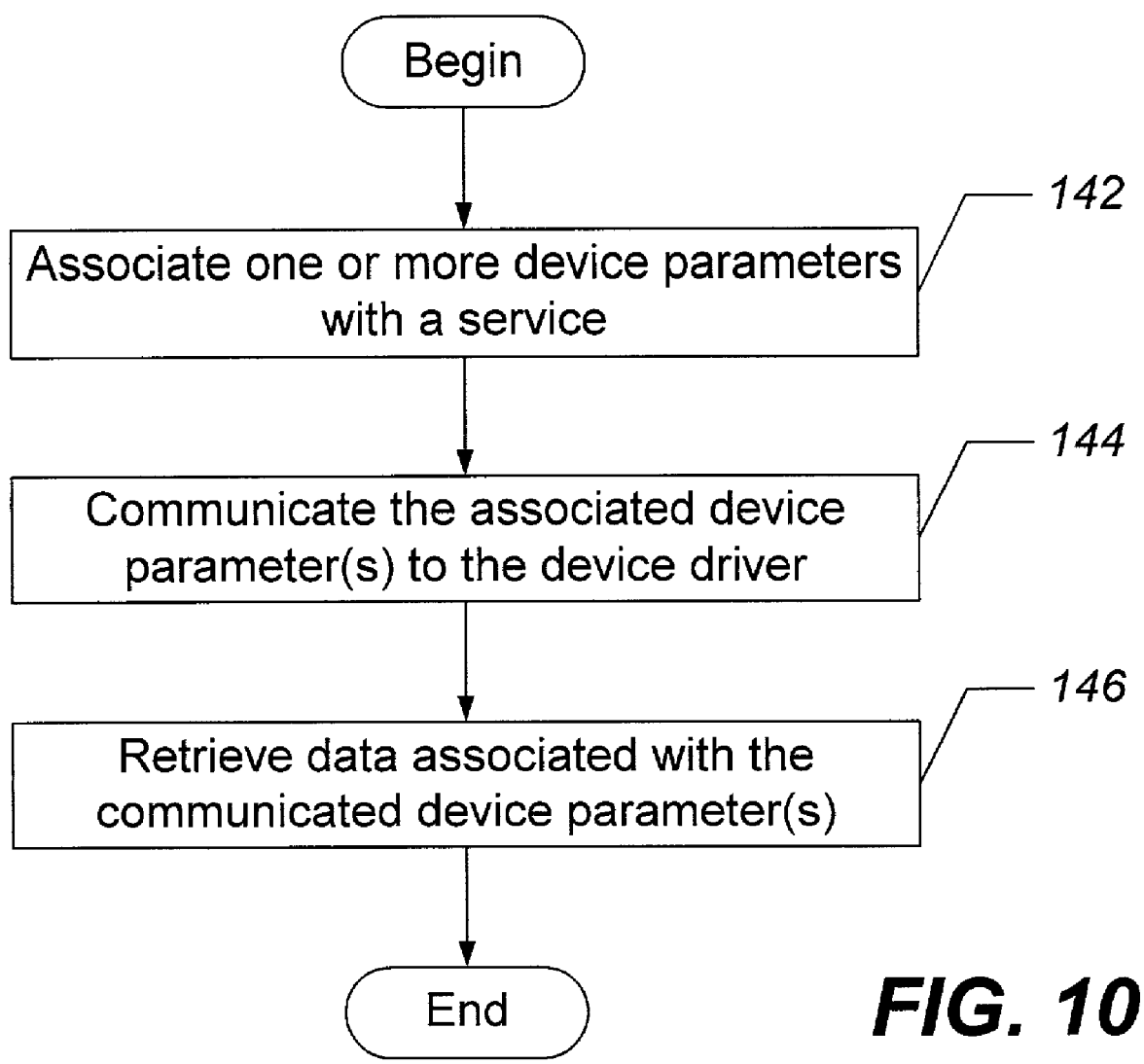

In accordance with further embodiments of the present invention, data may be retrieved from a particular device based on device parameters that are associated with a specific service. Referring now to FIG. 10, one or more device parameters may be associated with a service at block 142 and these associated device parameters may be communicated to the device driver 92 at block 144 as discussed hereinabove with respect to blocks 124 and 126 of FIG. 8. The data associated with the device parameters communicated to the device driver 92 may then be retrieved from one or more devices in the network 22.

The flowcharts of FIGS. 6-10 illustrate the architecture, functionality, and operations of embodiments of the service management system 24 software. In this regard, each block represents a module, segment, or portion of code, which comprises one or more executable instructions for implementing the specified logical function(s). It should also be noted that in some alternative implementations, the function(s) noted in the blocks may occur out of the order noted in FIGS. 6-10. For example, two blocks shown in succession may, in fact, be executed substantially concurrently or the blocks may sometimes be executed in the reverse order, depending on the functionality involved.

From the foregoing it can readily be seen that, in accordance with embodiments of the present invention, a "generic" device driver may be dynamically configured at run-time to communicate with devices of a particular device type and/or a service parameter translator module may be dynamically configured to associate one or more device parameters with a particular service. These device parameters that are associated with a particular service may then be passed to the device driver to allow the device driver to collect data from a particular device that is relevant to a particular service offering. Embodiments of the present invention, therefore, may be used by a service management system or operational support system for a network to dynamically adapt to new devices installed in the network and/or to new services provided via the network.

Many variations and modifications can be made to the preferred embodiments without substantially departing from the principles of the present invention. All such variations and modifications are intended to be included herein within the scope of the present invention, as set forth in the following claims.

We claim:

1. A computer implemented method of instantiating a device driver, comprising:

defining a plurality of device parameters;

declaring a parameter base class that defines the plurality of the device parameters;

associating at least one of the plurality of device parameters with a service;

instantiating a service-specific sub-class to create a service-specific sub-class object;

instantiating the parameter base class to create a parameter base class object;

communicating the at least one of the plurality of device parameters associated with the service to the device driver; and dynamically associating a first software component with the device driver at run-time, the first software component containing information that facilitates communication with devices of a specific device type.

2. A method as recited in claim 1, wherein associating the at least one of the plurality of device parameters with the service comprises:

deriving the service-specific sub-class from the base class that defines the at least one of the plurality of device parameters that are associated with the service.

3. A method as recited in claim 2, wherein communicating the at least one of the plurality of device parameters associated with the service to the device driver comprises:
passing the at least one of the plurality of device parameters associated with the service from the service-specific sub-class object to the device driver.

4. A method as recited in claim 1, further comprising:
defining a plurality of service-specific device parameters;
associating the device parameters with the service-specific device parameters; and
communicating the device parameters with the service-specific device parameters to the device driver.

5. A method as recited in claim 4,
wherein defining the plurality of service-specific device parameters comprises:
providing a second software component that comprises one of a script file and an extensible markup language (XML) file.

6. A method as recited in claim 5, wherein associating the device parameters with the service-specific device parameters comprises:
dynamically loading the parameter base class object with the second software component at run time.

7. A method as recited in claim 6, wherein communicating the device parameters and the service-specific device parameters to the device driver comprises:
passing the device parameters and the service-specific device parameters from the parameter base class object to the device driver after loading the parameter base class object with the second software component at run time.

8. A method as recited in claim 1, wherein the first software component comprises one of a script file and an extensible markup language (XML) file.

9. A method as recited in claim 1, wherein dynamically associating the first software component with the device driver at run-time comprises:
selecting the first software component from a plurality of software components, respective ones of the plurality of software components being associated with respective ones of a plurality of device types.

10. A method as recited in claim 9, further comprising:
generating the plurality of software components based on a plurality of management information base (MIB) files, respective ones of the plurality of MIB files being associated with respective ones of the plurality of device types.

11. A computer implemented method of collecting data from a device, comprising:
defining a plurality of device parameters;
declaring a parameter base class that defines the plurality of the device parameters;
associating at least one of the plurality of device parameters with a service;
instantiating a service-specific sub-class to create a service-specific sub-class object;
instantiating the parameter base class to create a parameter base class object;
communicating the at least one of the plurality of device parameters associated with the service to a device driver;
receiving a request to collect data from the device;
dynamically associating a software component with the device driver at run-time, the software component containing information that facilitates communication with the device; and
retrieving data associated with the at least one device parameter from the device using the device driver.

12. A method as recited in claim 11, wherein the first software component comprises one of a script file and an extensible markup language (XML) file.

13. A method as recited in claim 11, wherein dynamically associating the software component with the device driver at run-time comprises:
selecting the first software component from a plurality of software components, respective ones of the plurality of software components being associated with respective ones of a plurality of device types.

14. A system for instantiating a device driver, comprising:
means for defining a plurality of device parameters;
means for declaring a parameter base class that defines the plurality of the device parameters;
means for associating at least one of the plurality of device parameters with a service;
means for instantiating a service-specific sub-class to create a service-specific sub-class object;
means for instantiating the parameter base class to create a parameter base class object:
means for communicating the at least one of the plurality of device parameters associated with the service to the device driver; and
means for dynamically associating a first software component with the device driver at run-time, the first software component containing information that facilitates communication with devices of a specific device type.

15. A system as recited in claim 14,
wherein the means for associating the at least one of the plurality of device parameters with the service comprises:
means for deriving the service-specific sub-class from the base class that defines the at least one of the plurality of device parameters that are associated with the service.

16. A system as recited in claim 15, wherein the means for communicating the at least one of the plurality of device parameters associated with the service to the device driver comprises:
means for passing the at least one of the plurality of device parameters associated with the service from the service-specific sub-class object to the device driver.

17. A system as recited in claim 14, further comprising:
means for defining a plurality of service-specific device parameters;
means for associating the device parameters with the service-specific device parameters; and
means for communicating the device parameters with the service-specific device parameters to the device driver.

18. A system as recited in claim 17,
wherein the means for defining the plurality of service-specific device parameters comprises:
means for providing a second software component that comprises one of a script file and an extensible markup language (XML) file.

19. A system as recited in claim 18, wherein the means for associating the device parameters with the service-specific device parameters comprises:
means for dynamically loading the parameter base class object with the second software component at run time.

20. A system as recited in claim 19, wherein the means for communicating the device parameters and the service-specific device parameters to the device driver comprises:
means for passing the device parameters and the service-specific device parameters from the parameter base class object to the device driver after loading the parameter base class object with the second software component at run time.

21. A system as recited in claim 14, wherein the first software component comprises one of a script file and an extensible markup language (XML) file.

22. A system as recited in claim 14, wherein the means for dynamically associating the first software component with the device driver at run-time comprises:
means for selecting the first software component from a plurality of software components, respective ones of the plurality of software components being associated with respective ones of a plurality of device types.

23. A system as recited in claim 22, further comprising:
means for generating the plurality of software components based on a plurality of management information base (MIB) files, respective ones of the plurality of MIB files being associated with respective ones of the plurality of device types.

24. A system for collecting data from a device, comprising:
means for defining a plurality of device parameters;
means for declaring a parameter base class that defines the plurality of the device parameters;
means for associating at least one of the plurality of device parameters with a service;
means for instantiating a service-specific sub-class to create a service-specific sub-class object;
means for instantiating the parameter base class to create a parameter base class object;
means for communicating the at least one of the plurality of device parameters associated with the service to a device driver;
means for receiving a request to collect data from the device;
means for dynamically associating a software component with the device driver at run-time, the software component containing information that facilitates communication with the device; and
means for retrieving data associated with the at least one device parameter from the device using the device driver.

25. A system as recited in claim 24, wherein the first software component comprises one of a script file and an extensible markup language (XML) file.

26. A system as recited in claim 24, wherein the means for dynamically associating the software component with the device driver at run-time comprises:
means for selecting the first software component from a plurality of software components, respective ones of the plurality of software components being associated with respective ones of a plurality of device types.

27. A computer program product for instantiating a device driver, comprising:
a computer readable storage medium having computer readable program code embodied therein, the computer readable program code comprising:
computer readable program code for defining a plurality of device parameters;
computer readable program code for declaring a parameter base class that defines the plurality of the device parameters;
computer readable program code for associating at least one of the plurality of device parameters with a service;
computer readable program code for instantiating a service-specific sub-class to create a service-specific sub-class object;
computer readable program code for instantiating the parameter base class to create a parameter base class object;
computer readable program code for communicating the at least one of the plurality of device parameters associated with the service to the device driver; and
computer readable program code for dynamically associating a first software component with the device driver at run-time, the first software component containing information that facilitates communication with devices of a specific device type.

28. A computer program product as recited in claim 27, wherein the computer readable program code for associating the at least one of the plurality of device parameters with the service comprises:
computer readable program code for deriving the service-specific sub-class from the base class that defines the at least one of the plurality of device parameters that are associated with the service.

29. A computer program product as recited in claim 28, wherein the computer readable program code for communicating the at least one of the plurality of device parameters associated with the service to the device driver comprises:
computer readable program code for passing the at least one of the plurality of device parameters associated with the service from the service-specific sub-class object to the device driver.

30. A computer program product as recited in claim 27, further comprising:
computer readable program code for defining a plurality of service-specific device parameters;
computer readable program code for associating the device parameters with the service-specific device parameters; and
computer readable program code for communicating the device parameters with the service-specific device parameters to the device driver.

31. A computer program product as recited in claim 30, wherein the computer readable program code for defining the plurality of service-specific device parameters comprises:
computer readable program code for providing a second software component that comprises one of a script file and an extensible markup language (XML) file.

32. A computer program product as recited in claim 31, wherein the computer readable program code for associating the device parameters with the service-specific device parameters comprises:
computer readable program code for dynamically loading the parameter base class object with the second software component at run time.

33. A computer program product as recited in claim 32, wherein the computer readable program code for communicating the device parameters and the service-specific device parameters to the device driver comprises:
computer readable program code for passing the device parameters and the service-specific device parameters from the parameter base class object to the device driver after loading the parameter base class object with the second software component at run time.

34. A computer program product as recited in claim 27, wherein the first software component comprises one of a script file and an extensible markup language (XML) file.

35. A computer program product as recited in claim 27, wherein the computer readable program code for dynamically associating the first software component with the device driver at run-time comprises:
computer readable program code for selecting the first software component from a plurality of software components, respective ones of the plurality of software components being associated with respective ones of a plurality of device types.

36. A computer program product as recited in claim 35, further comprising:

computer readable program code for generating the plurality of software components based on a plurality of management information base (MIB) files, respective ones of the plurality of MIB files being associated with respective ones of the plurality of device types.

37. A computer program product for collecting data from a device, comprising:

a computer readable storage medium having computer readable program code embodied therein, the computer readable program code comprising:

computer readable program code for defining a plurality of device parameters;

computer readable program code for declaring a parameter base class that defines the plurality of the device parameters;

computer readable program code for associating at least one of the plurality of device parameters with a service;

computer readable program code for instantiating a service-specific sub-class to create a service-specific sub-class object;

computer readable program code for instantiating the parameter base class to create a parameter base class object;

computer readable program code for communicating the at least one of the plurality of device parameters associated with the service to a device driver;

computer readable program code for receiving a request to collect data from the device;

computer readable program code for dynamically associating a software component with the device driver at run-time, the software component containing information that facilitates communication with the device; and computer readable program code for retrieving data associated with the at least one device parameter from the device using the device driver.

38. A computer program product as recited in claim 37, wherein the first software component comprises one of a script file and an extensible markup language (XML) file.

39. A computer program product as recited in claim 37, wherein the computer readable program code for dynamically associating the software component with the device driver at run-time comprises:

computer readable program code for selecting the first software component from a plurality of software components, respective ones of the plurality of software components being associated with respective ones of a plurality of device types.

* * * * *